United States Patent
Camilo et al.

(10) Patent No.: US 11,174,358 B2
(45) Date of Patent: Nov. 16, 2021

(54) REPROCESSING OF POLYMERIC COMPOSITIONS

(71) Applicant: Braskem S.A., Camaçari (BR)

(72) Inventors: Ana Paula Rodrigues Camilo, São Paulo (BR); Bárbara Iria Silva Mano, São Paulo (BR); Marcelo Farah, São Paulo (BR); Marcos Roberto Paulino Bueno, São Paulo (BR); Mariele Kaipers Stocker, São Paulo (BR)

(73) Assignee: Braskem S.A., Camaçari (BR)

( * ) Notice: Subject to any disclaimer, the term of this patent is extended or adjusted under 35 U.S.C. 154(b) by 102 days.

(21) Appl. No.: 16/502,724

(22) Filed: Jul. 3, 2019

(65) Prior Publication Data
US 2019/0330428 A1    Oct. 31, 2019

Related U.S. Application Data

(63) Continuation of application No. PCT/IB2019/020011, filed on Apr. 19, 2019, and a continuation-in-part of application No. 15/282,169, filed on Sep. 30, 2016, now Pat. No. 10,731,029.

(60) Provisional application No. 62/678,833, filed on May 31, 2018, provisional application No. 62/236,042, filed on Oct. 1, 2015.

(51) Int. Cl.
| | | |
|---|---|---|
| *C08J 3/24* | (2006.01) | |
| *C08K 5/1539* | (2006.01) | |
| *C08J 3/22* | (2006.01) | |
| *C08K 5/092* | (2006.01) | |
| *C08L 29/04* | (2006.01) | |

(52) U.S. Cl.
CPC . *C08J 3/24* (2013.01); *C08J 3/22* (2013.01); *C08K 5/092* (2013.01); *C08K 5/1539* (2013.01); *C08L 29/04* (2013.01); *C08J 2323/08* (2013.01); *C08J 2329/04* (2013.01); *C08J 2331/04* (2013.01)

(58) Field of Classification Search
CPC ...... C08L 23/06; C08L 23/08; C08L 23/0807; C08L 23/0815; C08L 23/0823; C08L 29/04; C08L 31/04; C08L 23/0876; C08L 2205/22
See application file for complete search history.

(56) References Cited

U.S. PATENT DOCUMENTS

| | | | | |
|---|---|---|---|---|
| 5,198,497 A | * | 3/1993 | Mathur | C08L 23/08 |
| | | | | 523/437 |
| 2011/0152408 A1 | * | 6/2011 | Cunningham | C09D 151/04 |
| | | | | 523/437 |
| 2017/0096552 A1 | * | 4/2017 | Habert | C08L 51/06 |
| 2017/0261131 A1 | | 9/2017 | Papillon et al. | |

FOREIGN PATENT DOCUMENTS

| | | |
|---|---|---|
| EP | 0 887 372 A1 | 12/1998 |
| EP | 0 931 809 A2 | 7/1999 |
| EP | 2 223 965 A1 | 9/2010 |

OTHER PUBLICATIONS

PCT International Search Report and Written Opinion dated Jul. 12, 2019, in corresponding International Application No. PCT/IB2019/020011 (13 pages).

* cited by examiner

*Primary Examiner* — Jeffrey C Mullis
(74) *Attorney, Agent, or Firm* — Osha Bergman Watanabe & Burton LLP

(57) ABSTRACT

A method may include reprocessing a polymer composition comprising a crosslinked polymeric composition, wherein the crosslinked polymeric composition comprises a matrix polymer having a polar polymer internal phase that is selectively crosslinked with a crosslinking agent, wherein the reprocessed polymer composition retains an environmental stress cracking resistance within 60% of the value for the initial polymer composition when measured according to ASTM D-1693 procedure B and wherein the reprocessed polymer composition presents a Normalized Property Balance Index ($N_{PBI}$) greater than about 1.0.

26 Claims, No Drawings

REPROCESSING OF POLYMERIC COMPOSITIONS

CROSS-REFERENCE TO RELATED APPLICATIONS

This application is a continuation application of PCT/IB2019/020011 filed on Apr. 19, 2019, which claims priority to U.S. Provisional Patent Application No. 62/678,833 filed on May 31, 2018, and this application is a continuation-in-part application of U.S. patent application Ser. No. 15/282,169 filed on Sep. 30, 2016, which claims priority to U.S. Provisional Patent Application No. 62/236,042 filed on Oct. 1, 2015, all of which are incorporated herein by reference.

BACKGROUND

Polyolefins such as polyethylene (PE) and polypropylene (PP) may be used to manufacture a varied range of articles, including films, molded products, foams, and the like. Polyolefins may have characteristics such as high processability, low production cost, flexibility, low density and recycling possibility. However, physical and chemical properties of polyolefin compositions may exhibit varied responses depending on a number of factors such as molecular weight, distribution of molecular weights, content and distribution of comonomer (or comonomers), method of processing, and the like.

Methods of manufacturing may utilize polyolefin's limited inter- and intra-molecular interactions, capitalizing on the high degree of freedom in the polymer to form different microstructures, and to modify the polymer to provide varied uses in a number of technical markets. However, polyolefin materials may have a number of limitations, which can restrict application such as susceptibility to deformation and degradation in the presence of some chemical agents, and low barrier properties to various gases and a number of volatile organic compounds (VOC). Property limitations may hinder the use of polyolefin materials in the production of articles requiring low permeability to gases and solvents, such as packaging for food products, chemicals, household chemicals, agrochemicals, fuel tanks, water and gas pipes, and geomembranes, for example.

While polyolefins are utilized in industrial applications because of favorable characteristics such as high processability, low production cost, flexibility, low density, and ease of recycling, polyolefin compositions may have physical limitations, such as susceptibility to environmental stress cracking (ESC) and accelerated slow crack growth (SCG), which may occur below the yield strength limit of the material when subjected to long-term mechanical stress. Polyolefin materials may also exhibit sensitivity to certain groups of chemical substances, which can lead to deformation and degradation. As a result, chemical sensitivities and physical limitations may limit the success in the replacement of other industry standard materials, such as steel and glass, with polyolefin materials because the material durability is insufficient to prevent chemical damage and spillage.

Conventionally, methods of altering the chemical nature of the polymer composition may include modifying the polymer synthesis technique or the inclusion of one or more comonomers. However, modifying the polyolefin may also result in undesirable side effects. By way of illustration, increasing the molecular weight of a polyolefin may produce changes in the SCG and ESC, but can also increase viscosity, which may limit the processability and moldability of the polymer composition.

Other strategies may include inclusion of a comonomer and/or blending polyolefins with other polymer classes and additives to confer various physical and chemical attributes. For example, polyolefins may be copolymerized with alpha-olefins having a lower elastic modulus, which results in a considerable increase in environmental stress cracking resistance (ESCR) and resistance to impact but adversely affects the stiffness of the polymer. However, the use of alpha-olefins may have limited effectiveness because, while the incorporation of alpha-olefin comonomers must occur in the high molecular weight fraction in order to affect ESC and impact resistance, many popular catalyst systems have a low probability of inserting alpha-olefins in the high molecular weight fraction, an important factor in forming "tie molecules" between the chains of the surrounding polyolefin that are responsible for transferring stress between the crystalline regions and, consequently, responsible for important mechanical properties. The result is the production of a polymer composition having reduced structural stiffness. It is also noted that, while advances have developed catalysts that increase the likelihood of displacing the incorporation of a comonomer to the highest molecular weight range, and that multiple reactors may be used to address these limitations, such modifications are expensive alternatives and not wholly effective in balancing resistance to impact and ESC without negatively affecting stiffness.

Polymer modification by blending may vary the chemical nature of the composition, resulting in changes to the overall physical properties of the material. Material changes introduced by polymer blending may be unpredictable, however, and, depending on the nature of the polymers and additives incorporated, the resulting changes may be uneven and some material attributes may be enhanced while others exhibit notable deficits. The incorporation of a second phase into the matrix polymer, which generally has a different chemical nature, may increase the resistance to impact and ESC resistance in some cases. However, like the copolymerization strategy, polymer blends are often accompanied by a marked loss in stiffness, because the blended materials may have lower elastic modulus than the matrix polyolefin.

Accordingly, there exists a continuing need for developments in polyolefin compositions to have increases in environmental stress cracking resistance while balancing the mechanical properties of the polymer.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method that includes reprocessing a polymer composition comprising a crosslinked polymeric composition, wherein the crosslinked polymeric composition comprises a matrix polymer having a polar polymer internal phase that is selectively crosslinked with a crosslinking agent, wherein the reprocessed polymer composition retains an environmental stress cracking resistance within 60% of the value for the initial polymer composition when measured according to ASTM D-1693 procedure B and wherein the reprocessed polymer composition presents a Normalized Property Balance Index ($N_{PBI}$) greater than about 1.0, wherein the $N_{PBI}$ is calculated according to the formula:

$$N_{PBI} = \frac{PBI_{sample}}{PBI_{reference}},$$

where $PBI_{Sample}$ is the property balance index for a sample of the polymer composition, and $PBI_{Reference}$ is the property balance index of a reference polymer composition consisting of a matrix polymer composition without the reprocessing; and wherein PBI is calculated according to the formula:

$$PBI = \frac{FM \times IR \times ESCR}{10^7},$$

where FM is the stiffness of the sample as determined by secant modulus of elasticity at 1% deformation according to ASTM D-790, IR is the IZOD impact resistance according to ASTM D-256, and ESCR is the environmental stress cracking resistance according to ASTM D1693 procedure B.

In another aspect, embodiments disclosed herein relate to a polymer composition that includes a crosslinked polymeric composition comprising: a matrix polymer comprising a polyolefin, and one or more polymer particles dispersed in the polymer matrix, wherein the one or more polymer particles comprise a polar polymer selectively crosslinked with a crosslinking agent, wherein the crosslinked polymer composition retains an environmental stress cracking resistance after reprocessing that is within 60% of the value for the initial crosslinked polymeric composition when measured according to ASTM D-1693 procedure B.

In yet another aspect, embodiments disclosed herein relate to a manufactured article that includes a polymer composition that includes a crosslinked polymeric composition comprising: a matrix polymer comprising a polyolefin, and one or more polymer particles dispersed in the polymer matrix, wherein the one or more polymer particles comprise a polar polymer selectively crosslinked with a crosslinking agent, wherein the crosslinked polymer composition retains an environmental stress cracking resistance after reprocessing that is within 60% of the value for the initial crosslinked polymeric composition when measured according to ASTM D-1693 procedure B.

In yet another aspect, embodiments disclosed herein relate to use of a recycled crosslinked polymer composition to improve the properties of a second polymer composition, the recycled crosslinked polymer composition comprising a matrix polymer having a polar polymer internal phase that is selectively crosslinked with a crosslinking agent.

In yet another aspect, embodiments disclosed herein relate to use of a recycled crosslinked polymer composition to form an injection molded article, a thermoformed article, a film, a foam, a blow molded article, a 3D printed article, a compression molded article, a coextruded article, a laminated article, an injection blow molded article, a rotomolded article, an extruded article, or a pultruded article, wherein the recycled crosslinked polymer composition comprising a matrix polymer having a polar polymer internal phase that is selectively crosslinked with a crosslinking agent.

Other aspects and advantages of the claimed subject matter will be apparent from the following description and the appended claims.

DETAILED DESCRIPTION

Embodiments of the present disclosure are directed to polymer compositions that contained a crosslinked polymeric composition that may be used to maintain the properties (including but not limited to environmental stress cracking resistance) during reprocessing thereof, as well as during reprocessing of a secondary polymer composition to which the crosslinked polymeric composition is added. The crosslinked polymeric composition may include a matrix polymer of a polyolefin and one or more polymer particles dispersed in the polymer matrix, where one or more polymer particles includes a polar polymer that is selectively crosslinked with a crosslinking agent. In particular, the crosslinked polymeric composition may provide function to improve the properties of the secondary polymer composition to which the crosslinked polymeric composition is added. The crosslinked polymer composition containing a mixture of polyolefin and polar polymer particles that may induce structural and/or morphological changes when compared to an unmodified polymer or blend, which may provide for the property improvement during reprocessing particularly as compared to a matrix polymer alone (without the selectively crosslinked particles) that is subjected to such reprocessing and/or a secondary polymer composition that is reprocessed.

In some embodiments, the polar polymer within the polymer composition may be crosslinked by a crosslinking agent to generate particulates containing intra-particle covalent linkages between the constituent polar polymer chains. Depending on the concentration and relative proximity of adjacent polar polymer particles, inter-particle covalent linkages may also be formed. The crosslinked polar polymer particles may create changes in the physical and physicochemical properties, including increases in ESCR, and improvement in the balance of stiffness/impact resistance mechanical properties in relation to the properties of pure (unmodified or blended) polyolefins, as well as to secondary polymer compositions to which the crosslinked polymeric was added. The present inventors have found that such properties survive reprocessing of the polymer composition such that the polymer composition can be reprocessed without substantial losses in its properties, or with a slow decay in its properties.

In one or more embodiments, the balance of properties for modified polymer compositions may be expressed through a property balance index, which considers the combination of the flexural modulus, impact resistance and ESCR, discussed in greater detail below. The property balance index may be normalized against a reference polyolefin (without the polar polymer, etc.), and advantageously, the polymer compositions of the present disclosure may achieve a normalized property balance index that ranges from about 1.5 to 10, or greater than 1.5, or greater than 1.8, or from 3 to 6 in more particular embodiments.

Crosslinked Polymeric Compositions

In one or more embodiments, polymer compositions in accordance with the present disclosure may include a polyolefin matrix polymer having and internal polar polymer phase that is crosslinked by a suitable crosslinking agent. Crosslinked polymeric compositions may be blended with various polymer types to modify a number of properties including environmental stress cracking resistance, and the like.

Matrix Polymer

Crosslinked polymeric compositions in accordance with the present disclosure may include a matrix polymer component that surrounds other components in the composition, including polar polymer particles and other additives. In one or more embodiments, matrix polymers may include polyolefins produced from unsaturated monomers with the general chemical formula of $C_nH_{2n}$. In some embodiments, polyolefins may include ethylene homopolymers, copolymers of ethylene and one or more C3-C20 alpha-olefins, propylene homopolymers, heterophasic propylene polymers, copolymers of propylene and one or more comonomers selected from ethylene and C4-C20 alpha-olefins, olefin terpolymers and higher order polymers, and blends obtained from the mixture of one or more of these polymers and/or copolymers.

In one or more embodiments, matrix polymer may be selected from polyethylene with a density ranging from a lower limit selected from one of 0.890, 0.900, 0.910, 0.920, 0.930 and 0.940 g/cm³ to an upper limit selected from one of 0.945, 0.950, 0.960 and 0.970 g/cm³ measured according to ASTM D792, a melt index ($I_2$) ranging from a lower limit selected from one of 0.01, 0.1, 1, 10 and 50 g/10 min to an upperlimit selected from one of 10, 20, 50, 60, 100, and 200 g/10 min according to ASTM D1238 at 190° C./2.16 kg and/or a melt index ($I_{21}$) ranging from a lower limit selected from one of 0.1, 1, 3. 5 10 and 50 g/10 min to an upper limit selected from one of 10, 20, 30, 50, 100, 500, and 1000 g/10 min according to ASTM D1238 at 190° C./21.6 kg.

In one or more embodiments, the matrix polymer may include a high density polyethylene, with a density ranging from 0.930 g/cm³ to 0.970 g/cm³ according to ASTM D792 and a High Load Melt Index (HLMI) ranging from 1 to 60 g/10 min according to ASTM D1238 at 190° C./21.6 kg. In one or more embodiments, the matrix polymer may include a high density polyethylene, with a density ranging from 0.940 g/cm³ to 0.970 g/cm³ according to ASTM D792 and a High Load Melt Index (HLMI) ranging from 1 to 60 g/10 min according to ASTM D1238 at 190° C./21.6 kg.

In one or more embodiments, polymer compositions may contain a percent by weight of the total composition (wt %) of matrix polymer ranging from a lower limit selected from one of 30 wt %, 40 wt %, 50 wt %, 60 wt %, 75 wt %, and 85 wt %, to an upper limit selected from one of 60 wt %, 75 wt %, 80 wt %, 90 wt %, 95 wt %, 99.5 wt % and 99.9 wt %, where any lower limit can be used with any upper limit.

Polar Polymers

Polymer compositions in accordance with the present disclosure may include one or more polar polymers that are combined with a polyolefin and, further, may be crosslinked by one or more crosslinking agents. As used herein, a "polar polymer" is understood to mean any polymer containing hydroxyl, carboxylic acid, carboxylate, ester, ether, acetate, amide, amine, epoxy, imide, imine, sulfone, phosphone, and their derivatives, as functional groups, among others. The polar polymer may be selectively crosslinked by an appropriate crosslinking agent, where the selective crosslinking may occur between the functional groups by reacting with a suitable crosslinking agent in the presence of polyolefins, additives, and other materials. Thus, the crosslinking agent is selected to react with the polar polymer but without exhibiting reactivity (or having minimal reactivity towards) the polyolefin. In some embodiments, polar polymers include polyvinyl alcohol (PVOH), ethylene vinyl alcohol (EVOH) copolymer, ethylene vinyl acetate copolymer (EVA) and mixtures thereof. In particular embodiments, polar polymers include polyvinyl alcohol.

One or more polar polymers in accordance with the present disclosure may be produced by hydrolyzing a polyvinyl ester to produce free hydroxyl groups on the polymer backbone. By way of example, polar polymers produced through hydrolysis may include polyvinyl alcohol generated from the hydrolysis of polyvinyl acetate. The degree of hydrolysis for a polymer hydrolyzed to produce a polar polymer may be within the range of 30% and 100% in some embodiments, and between 70% and 99% in some embodiments.

Polar polymers in accordance with the present disclosure may have an intrinsic viscosity in the range of 2 mPa·s to 110 mPa·s in some embodiments, and between 4 mPa·s and 31 mPa·s in some embodiments. Intrinsic viscosity may be measured according to DIN 53015 using a 4% aqueous solution at 20° C.

In one or more embodiments, polar polymer in accordance with the present disclosure may form a distinct phase within the polymer composition, which may be in the form of particles having an average particle size of less than 200 µm. Particle size determinations may be made in some embodiments using SEM techniques after the combination with the polyolefin. Polar polymer particles in accordance with the present disclosure may have an average particle size having a lower limit selected from 0.01 µm, 0.5 µm, 1 µm, and 5 µm, and an upper limit selected from 10 µm, 20 µm, 30 µm, 50 µm, and 200 µm, where any lower limit may be used with any upper limit.

Particle size may be determined by calculating relevant statistical data regarding particle size. In some embodiments, SEM imaging may be used to calculate particle size and develop size ranges using statistical analysis known for polymers and blends. Samples may be examined using SEM after hot pressing the samples in accordance with ASTM D-4703 and polishing the internal part of the plate by cryo-ultramicrotomy. Samples may be dried and submitted to metallization with gold. The images may be obtained by FESEM (Field Emission Scanning Electron Microscopy, Model Inspect F50, from FEI), or by Tabletop SEM (Model TM-1000, from Hitachi). The size of each crosslinked polar polymer particle may be measured from these images using the software LAS (version 43, from Leica). Calibration may be performed using the scale bar of each image and the measured values can be statistically analyzed by the software. The average value and standard deviation are given by the measurement of, at least, 300 particles.

In one or more embodiments, polymer compositions may contain a percent by weight of the total composition (wt %) of polar polymer ranging from a lower limit selected from one of 0.1 wt %, 0.25 wt %, 0.5 wt %, 1 wt %, 2 wt %, 5 wt %, 10 wt %, 15 wt %, and 25 wt %, to an upper limit selected from one of 5 wt %, 10 wt %, 15 wt %, 25 wt %, 50 wt %, 60 wt %, and 70 wt %, where any lower limit can be used with any upper limit.

Functionalized Polyolefin

In some embodiments, compatibilizing agents such as functionalized polyolefins may be optionally added to modify the interactions between the polyolefin and the polar polymer. As used herein, "functionalized polyolefin" (or compatibilizing agent) is understood to mean any polyolefin which had its chemical composition altered by grafting or copolymerization, or other chemical process, using polar functionalizing reagents. Functionalized polyolefins in accordance with the present disclosure include polyolefins functionalized with maleic anhydride, maleic acid, acrylic acid, methacrylic acid, itaconic acid, itaconic anhydride, methacrylate, acrylate, epoxy, silane, succinic acid, succinic anhydride, ionomers, and their derivatives, or any other polar comonomer, and mixtures thereof, produced in a reactor or by grafting.

In one or more embodiments, polymer compositions may contain a percent by weight of the total composition (wt %) of functionalized polyolefin ranging from a lower limit selected from one of 0.1 wt %, 0.5 wt %, 1 wt %, and 5 wt %, to an upper limit selected from one of 5 wt %, 7.5 wt %, 10 wt %, and 15 wt %, where any lower limit can be used with any upper limit.

Crosslinking Agent

In one or more embodiments, a crosslinking agent may be used to crosslink a selected polymer phase in a polymer composition. As used herein, a "crosslinking agent" is understood to mean any bi- or multi-functional chemical substance capable of reacting selectively with the polar groups of a polymer, forming crosslinks between and within the constituent polymer chains. As used herein, "selective" or "selectively" used alone or in conjunction with "crosslinking" or "crosslinked" is used to specify that the crosslinking agent reacts exclusively with the polar polymer, or that the crosslinking agent reacts with the polar polymer to a substantially greater degree (98% or greater, for example) than with respect to the polyolefin polymer.

Crosslinking agents in accordance with the present disclosure may react preferentially with a polar polymer, and may be non-reactive (or substantially non-reactive) with polyolefin. The crosslinking agent is considered non-reactive (or not substantially reactive) to polyolefin when a composition consisting of the crosslinking agent and polyolefin may be processed with no changes or variations within a value of 2% (or lower) in rheology (complex viscosity), FTIR, and ESCR according to any applicable measurement method, as compared to a composition containing the polyolefin alone, according to any applicable measurement method provided the same method is applied to the comparative polyolefin and to the composition consisting of polyolefin and crosslinking agent.

In one or more embodiments, crosslinking agents in accordance with the present disclosure may include linear, branched, saturated, and unsaturated carbon chains containing functional groups that react with counterpart functional groups present on the backbone and termini of a polar polymer incorporated into a polymer composition. In some embodiments, crosslinking agents may be added to a pre-mixed polymer blend containing a polyolefin and polar polymer particles, in order to crosslink the polar polymer in the presence of the polyolefin. Following addition to the pre-mixed polymer blend, a crosslinking agent may react with the polar polymer within the particles, creating intraparticle crosslinks between the polar polymer chains. Crosslinking agents in accordance with the present disclosure may include, for example, maleic anhydride, maleic acid, itaconic acid, itaconic anhydride, succinic acid, succinic anhydride, succinic aldehyde, adipic acid, adipic anhydride, phthalic anhydride, pthalic acid, citric acid, glutaconic acid, glutaconic anhydride, glutaraldehyde, sodium tetraborate, organic titanates such as tetrabutyl titanate, organic zirconates such as zirconium(IV) bis(diethyl citrato)dipropoxide, methoxy polyethylene glycol acrylates, ethoxy polyethylene glycol acrylates, ethylene glycol diacrylate, ethylene glycol dimethacrylate, polypropylene glycol diacrylate, polypropylene glycol dimethacrylate, 1,3-butylene glycol diacrylate, 1,3-butylene glycol dimethacrylate, neopentyl glycol diacrylate, neopentyl glycol dimethacrylate, trimethylol ethane triacrylate, trimethylol ethane trimethacrylate, trimethylol propane triacrylate, trimethylol propane trimethacrylate, and tetramethylol methane tetracrylate, their derivatives and mixtures thereof.

In one or more embodiments, crosslinking agents may be added to a blend used to form a polymer composition at a percent by weight (wt %) of the blend ranging from a lower limit selected from one of 0.001 wt %, 0.01 wt %, 0.05 wt %, 0.5 wt %, 1 wt %, and 2 wt % to an upper limit selected from one of 1.5 wt %, 2 wt %, 5 wt %, and 10 wt %, where any lower limit can be used with any upper limit.

As described herein, the crosslinked polymer composition may be reprocessed without substantial (or slow) decay in the environmental stress cracking resistance, as well as a Normalized Property Balance Index ($N_{PBI}$). Reprocessing may include regrinding the crosslinked polymer composition. Thus, a regrind is material that has undergone at least one processing method such as molding or extrusion and the subsequent sprue, runners, flash, rejected parts etc. are ground or chopped. For example, in extrusion blow molding, an amount of burr (often ranging from 10 to 30 wt % so as to maintain desired properties as much as possible) is produced, ground (known as regrind) and reprocessed for blending with virgin pellets. Both the heat history of processing and the grinding may generally lead to degraded physical, chemical and flow properties for the resin and subsequent parts made from this regrind; however, in accordance with the present embodiments, the crosslinked polymeric composition of the present disclosure may be reground without substantial decay in one or more of the properties thereof. In accordance with one or more embodiments of the present disclosure, a crosslinked polymeric composition may be reprocessed alone (100% reprocessed resin) or in combination with a virgin resin, including at amounts that are as low as 10 to 99 wt %; however, it is understood that final polymer composition and article that is formed has better properties, as described below, than comparative regrind without the selectively crosslinked polar polymer particles.

Specifically, the loss of the stress cracking resistance during reprocessing is low and the stress cracking resistance is very high compared to the matrix polymer without the reprocessing. In one or more embodiments, the crosslinked polymer composition retains an environmental stress cracking resistance after reprocessing that is within 60%, 70%, 80%, or even 90% in some embodiments of the value for the initial crosslinked polymeric composition (prior to the reprocessing) when measured according to ASTM D-1693 procedure B. In particular, in one or more embodiments, the crosslinked polymeric composition retains an environmental stress cracking resistance after reprocessing at least 3 times, or at least 5 times, that is within 60% of the value for the initial crosslinked polymeric composition when measured according to ASTM D1693 procedure B.

Changes in physical and chemical properties of polymer compositions in accordance with the present disclosure are characterized using an index of properties that may be used to quantify the changes in a respective polymer composition based on a balance of mechanical and ESCR properties. Improvements in a material's flexural modulus, impact resistance and ESCR may translate to better performance in various applications. However, improvements in a single property may be offset by losses in other properties. In order to quantify the overall improvement of the material, the product of the individual properties is monitored in the examples below. The "Property Balance Index" (PBI) is defined as shown in Eq. 1 to quantify the property changes, wherein "FM" is the flexural modulus given by the secant modulus at 1% of deformation measured according to ASTM D-790 in MPa, "IR" is the IZOD impact resistance at 23° C. measured according to ASTM D-256 in J/m, and "ESCR" is the environmental stress cracking resistance measured according to ASTM D-1693 procedure B in hours (h).

$$PBI = \frac{FM \times IR \times ESCR}{10^7} \quad (1)$$

Definition of the Normalized Property Balance Index

To compare the magnitude of property changes for different polymer systems, the PBI values were normalized according to Eq. 2, where $N_{PBI}$ is the normalized property balance index calculated as:

$$N_{PBI} = \frac{PBI_{sample}}{PBI_{reference}} \quad (2)$$

where $PBI_{Sample}$ is the property balance index for a sample of the polymer composition (reprocessed or not), and $PBI_{Reference}$ is the property balance index of a reference polymer composition consisting of a matrix polymer composition without the reprocessing.

Reprocessed polymer compositions in accordance with the present disclosure may exhibit an $N_{PBI}$ higher than about 1.0 in some embodiments, or higher than about one of 1.5, 2.0, 3.0, 5.0, or 10 in other embodiments. In another embodiment, polymer compositions in accordance with the present disclosure may exhibit an $N_{PBI}$ falling within the range of 1.5 to 10 in some embodiments, and within the range of 3 to 9 in some embodiments. Polymer compositions in accordance with the present disclosure may exhibit an $N_{PBI}$ that is at least 1.5 in other embodiments. In some embodiments, the $N_{PBI}$ value may be at least 1.8.

Secondary Polymer Compositions

Polymer compositions in accordance with the present disclosure may include a mixture of crosslinked polymeric composition with a secondary polymer composition. While a number of exemplary polymer materials are described below it is envisioned that the secondary polymer composition may be any polymer suited for manufacturing applications.

In one or more embodiments, the secondary polymer compositions may be selected from polyolefin, polystyrene, polyamide, polyester, ethylene vinyl alcohol, polyacrylate, polymethacrylate, poly(vinyl chloride), polycarbonate, polysaccharides, and rubber. Specifically, in one or more embodiments, the secondary polymer compositions may be selected from polyethylene, polypropylene, polystyrene, poly(ethylene terephthalate), poly(vinyl chloride), polycarbonate, poly(methyl methacrylate) and nylon. Further, it is also envisioned that any of the secondary polymers may be at least partially biobased. In one or more embodiments, the secondary polymer composition (including any of the above) may be a virgin polymer resin, while in others embodiments, the secondary polymer resin is a post-industrial polymer resin (PIR), a post-consumer polymer resin (PCR), a regrind polymer resin or combinations thereof.

It is recognized that the recycling of polymeric materials is a major concern for the environment. Generally, the recycling of PCR resins is difficult due to the degradation of the ESCR properties of the material as compared to virgin resins, which limits possible end use applications. It was surprisingly found that the addition of the crosslinked polymeric composition as a masterbatch (MB) composition and even in very low concentrations of MB, enables the increase in ESCR property of PIR and PCRs, making it possible to reuse them even in applications that require high ESCR, which normally is impossible to achieve with recycled resins. In particular embodiments, PIRs, PCRs, regrind polymer resins and combinations thereof may be present in the polymer composition in an amount higher than about 70 wt %, 80 wt %, 90 wt %, 95 wt %, 96 wt %, 97 wt %, 98 wt % or 99 wt %.

In one or more embodiments, secondary polymer compositions may include homopolymers, copolymers, graft copolymers, and heterophasic polymers. In some embodiments, secondary polymer compositions may include acrylonitrile; butadiene-styrene (ABS); polyvinyl chloride (PVC); polyesters that include polylactic acid (PLA), polyglycolic acid (PGA), poly-co-lactic-glycolic acid (PLGA), and the like; polyamides that include various nylons; polyacrylamide; polyacrylates; polymethacrylates; polyvinylalcohol (PVOH); polyolefins such as polypropylene polymers and copolymers; high melt strength polyolefins that include branched polyolefins and crosslinked polyolefins; polyolefin copolymers such as ethylene vinyl acetate (EVA); heterophasic polyolefins; polycarbonate (PC); polystyrene (PS); high impact polystyrene (HIPS), polycaprolactone (PCL); and the like.

In one or more embodiments, secondary polymer may be selected from polyethylene with a density ranging from a lower limit selected from one of 0.890, 0.900, 0.910, 0.920, 0.930 and 0.940 g/cm$^3$ to an upper limit selected from one of 0.945, 0.950, 0.960 and 0.970 g/cm$^3$ measured according to ASTM D792, wherein any lower limit may be used in combination with any upper limit, a melt index ($I_2$) ranging from a lower limit selected from one of 0.01, 0.1, 1, 10 and 50 g/10 min to an upper limit selected from one of 10, 20, 50, 100, and 200 g/10 min according to ASTM D1238 at 190° C./2.16 kg, wherein any lower limit may be used in combination with any upper limit, and/or a melt index ($I_{21}$) ranging from a lower limit selected from one of 0.1, 1, 3. 5 10 and 50 g/10 min to an upper limit selected from one of 10, 20, 30, 50, 60, 100, 500, and 1000 g/10 min according to ASTM D1238 at 190° C./21.6 kg, wherein any lower limit may be used in combination with any upper limit.

In one or more embodiments, the secondary polymer may include a high density polyethylene, with a density ranging from 0.930 g/cm$^3$ to 0.970 g/cm$^3$ according to ASTM D792 and a High Load Melt Index (HLMI) ranging from 1 to 60 g/10 min according to ASTM D1238 at 190° C./21.6 kg.

In one or more embodiments, the secondary polymer may be present in the polymer composition in an amount ranging from 5 to 99 wt % of the polymer composition, including having a lower limit of 5, 10, 15, 20, 25, 30, 35, 40, 45, or 50 wt % and an upper limit of 50, 55, 60, 65, 70, 75, 80, 85, 90, 95, or 99 wt %, where any lower limit can be used with any upper limit.

Additives

In one or more embodiments, the polymer compositions of the present disclosure may contain a number of other functional additives that modify various properties of the composition such as antioxidants, pigments, fillers, reinforcements, adhesion-promoting agents, biocides, whitening agents, nucleating agents, anti-statics, anti-blocking agents, processing aids, flame-retardants, plasticizers, light stabilizers, and the like.

Polymer compositions in accordance with the present disclosure may include fillers and additives that modify various physical and chemical properties when added to the polymer composition during blending. In one or more embodiments, fillers and nanofillers may be added to a polymer composition to increase the barrier properties of the material by increasing the tortuous path of the polymer matrix for the passage of permeate molecules. As used herein, "nanofiller" is defined as any inorganic substance with at least a nanometric scale dimension. Polymer composition in accordance with the present disclosure may be loaded with a filler and/or nanofiller that may include polyhedral oligomeric silsesquioxane (POSS), clays, nanoclays, silica particles, nanosilica, calcium nanocarbonate, metal oxide particles and nanoparticles, inorganic salt particles and nanoparticles, and mixtures thereof.

In one or more embodiments, fillers and/or nanofillers in accordance with the present disclosure may be incorporated into a polymer composition at a percent by weight (wt %) up to 70 wt %.

In one or more embodiments, polymer compositions may contain a percent by weight of the total composition (wt %) of one or more additives ranging from a lower limit selected from one of 0.001 wt %, 0.01 wt %, 0.05 wt %, 0.5 wt %, and 1 wt %, to an upper limit selected from one of 1.5 wt %, 2 wt %, 5 wt %, and 7 wt %, where any lower limit can be used with any upper limit.

Masterbatch Formulations

One or more of the wt % values mentioned above with respect to each of the components refer in fact to amounts that may be used to form such a masterbatch. In one or more embodiments, a masterbatch polymer composition may contain a percent by weight of the total composition (wt %) of crosslinked polar polymer ranging from a lower limit selected from one of 10 wt %, 20 wt % 25 wt %, 30 wt %, 40 wt %, and 50 wt % to an upper limit selected from one of 50 wt %, 60 wt %, and 70 wt %, where any lower limit can be used with any upper limit. In particular, as discussed herein, the crosslinked polymeric composition may be formulated as a masterbatch formulation that is combined with a secondary polymer composition to improve the properties of the secondary polymer composition, which may be a virgin polymer resin or a recycled material (including post-industrial resins, post-consumer resins, and regrind polymer resin). Specifically, even for overly degraded recycled materials, the masterbatch formulation (crosslinked polymeric composition) may be used to improve the properties of the secondary polymer composition in order to recover or restore (at least partially or wholly) the properties of the secondary polymer composition to its original level (i.e., to a level that is close to or substantially the same as a virgin resin thereof) or even higher than the original level.

As noted, in the masterbatch composition, the polymer composition contains concentrations of polar polymer that are high relative to the polar polymer concentration in a final polymer blend for manufacture or use. Thus, prior to use to form a manufactured article, the masterbatch composition may be combined with an additional quantity of polyolefin to arrive at a polar polymer concentration in the final composition that is lower than the masterbatch concentration. For example, the crosslinked polymeric composition may be present in the final polymer composition (combined with the secondary polymer composition) at a percent by weight of the polymer composition that ranges from 0.01 wt % to 95 wt %, where the lower limit may include any of 0.01, 1, 5, 10, 15, 20, 25, 30, 35, 40, 45, or 50 wt %, and the upper limit includes any of 50, 55, 60, 65, 70 75, 80, 85, 90, or 95 wt %, where any lower limit can be used in combination with any upper limit.

Polymer Composition Preparation Methods

Polymer compositions in accordance with the present disclosure may be prepared by a number of possible polymer blending and formulation techniques, which will be discussed in the following sections. In particular, as described herein, a crosslinked polymeric composition may optionally be combined with a secondary polymer composition; wherein combining the crosslinked polymeric composition with the secondary polymer compositions improves the environmental stress cracking resistance of the polymer composition with respect to the secondary polymer composition alone, particularly during reprocessing of the secondary polymer composition. Further, it is also envisioned that the crosslinked polymeric composition may be reprocessed and then added to a secondary polymer composition, i.e., the reprocessing of the secondary polymeric composition is optional.

In one or more embodiments, the crosslinked polymeric composition is combined with a secondary polymer composition in a melt blend process. In one or more other embodiments, the crosslinked polymeric composition is combined with a secondary polymer composition in a dry blend process. Thus, the crosslinked polymeric may be formulated as a masterbatch formulation that may be diluted in a subsequent melt-blend or dry blend process to form the final polymer composition having the improved properties. For example, the crosslinked polymeric composition may be initially formed, such as in a reactive extrusion process or the like to form the selectively crosslinked polymer particles within the matrix polymer. Such crosslinked polymeric composition may subsequently be combined with a secondary polymer composition, may subjected to a conventional extrusion process, for example, to blend the polymers together, thereby forming an improved secondary polymer.

Extrusion

In one or more embodiments, polymer compositions in accordance with the present disclosure may be prepared using continuous or discontinuous extrusion. Methods may use single-, twin- or multi-screw extruders, which may be used at temperatures ranging from 100° C. to 270° C. in some embodiments, and from 140° C. to 230° C. in some embodiments. In some embodiments, raw materials are added to an extruder, simultaneously or sequentially, into the main or secondary feeder in the form of powder, granules, flakes or dispersion in liquids as solutions, emulsions and suspensions of one or more components.

The components can be pre-dispersed in prior processes using intensive mixers, for example. Inside an extrusion equipment, the components are heated by heat exchange and/or mechanical friction, the phases are melt and the dispersion occurs by the deformation of the polymer. In some embodiments, one or more compatibilizing agents (such as a functionalized polyolefin) between polymers of different natures may be used to facilitate and/or refine the distribution of the polymer phases and to enable the formation of the morphology of conventional blend. The crosslinking agent can be added at the same extrusion stage or in a consecutive extrusion, according to selectivity and reactivity of the system.

In one or more embodiments, methods of preparing polymer compositions may involve a single extrusion or multiple extrusions following the sequences of the blend preparation stages. Blending and extrusion also involve the selective crosslinking of the polar polymer in the dispersed phase of the polymer composition by the crosslinking agent.

Extrusion techniques in accordance with the present disclosure may also involve the preparation of a polar polymer concentrate (a masterbatch), combined with a crosslinking agent in some embodiments, that is then combined with other components to produce a polymer composition of the present disclosure. In some embodiments, the morphology of a crosslinked polar polymer may be stabilized by crosslinking when dispersed in a polymer matrix containing polyolefins and is not dependent on subsequent processes for defining the morphology.

Polymer compositions prepared by extrusion may be in the form of granules that are applicable to different molding processes, including processes selected from extrusion molding, injection molding, thermoforming, cast film extrusion, blown film extrusion, foaming, extrusion blow-molding, ISBM (Injection Stretched Blow-Molding), rotomolding, pultrusion, additive manufacturing, lamination, and the like, to produce manufactured articles. Specifically, in one or more embodiments, the article is an injection molded article, a thermoformed article, a film, a foam, a blow molded article, a 3D printed article, a compressed article, a coextruded article, a laminated article, an injection blow molded article, a rotomolded article, an extruded article, monolayer articles, multilayer articles, or a pultruded article. In embodiments of a multilayer article, it is envisioned that at least one of the layers comprises the polymer composition of the present disclosure.

Applications

In one or more embodiments, polymer compositions may be used in the manufacturing of articles, including rigid and flexible packaging for food products, chemicals, household chemicals, agrochemicals, fuel tanks, water and gas pipes, geomembranes, and the like.

Examples

In the following examples, a number of polymer samples are analyzed to demonstrate the changes in physical and chemical properties associated with polymer compositions prepared in accordance with the present disclosure.

Characterization Techniques

Prepared samples were characterized using a number of standardized and lab-based polymer characterization techniques discussed below.

Environmental Stress Cracking Resistance (ESCR)

For environmental stress cracking resistance tests, sample formulations were hot pressed in 2 mm thick plaques according to ASTM D-4703, at 200° C. and under pressure. Samples were notched, bent to achieve deformation and placed in a metal U-shaped specimen holder in accordance with ASTM D-1693 procedure B, and placed in an aqueous solution containing nonylphenol ethoxylate (IGEPALTM CO-630 from Solvay) at a percent by volume (vol %) of 10 vol %. Failure was determined as the appearance of any crack visible by the naked eye, in accordance with ASTM D-1693 procedure B.

Flexural Modulus

The flexural modulus of the material given by the secant modulus at 1% of deformation was determined in the flexural resistance test in accordance with ASTM D-790. The samples were previously compression molded in plaques in accordance with ASTM D4703.

IZOD Impact Resistance Test

The IZOD impact resistance at 23° C. of the material was determined according to ASTM D-256. Samples were previously compression molded in plaques in accordance with ASTM D4703.

Definition of the Property Balance Index

Changes in physical and chemical properties of polymer compositions in accordance with the present disclosure are characterized using an index of properties that may be used to quantify the changes in a respective polymer composition based on a balance of mechanical and ESCR properties. Improvements in a material's flexural modulus, impact resistance and ESCR may translate to better performance in various applications. However, improvements in a single property may be offset by losses in other properties. In order to quantify the overall improvement of the material, the product of the individual properties is monitored in the examples below. The "Property Balance Index" (PBI) is defined as shown in Eq. 1 to quantify the property changes, wherein "FM" is the flexural modulus given by the secant modulus at 1% of deformation measured according to ASTM D-790 in MPa, "IR" is the IZOD impact resistance at 23° C. measured according to ASTM D-256 in J/m, and "ESCR" is the environmental stress cracking resistance measured according to ASTM D-1693 procedure B in hours (h).

$$PBI = \frac{FM \times IR \times ESCR}{10^7} \quad (1)$$

Definition of the Normalized Property Balance Index

To compare the magnitude of property changes for different polymer systems, the PBI values were normalized according to Eq. 2, where $N_{PBI}$ is the normalized property balance index, $PBI_{sample}$ is the property balance index obtained for the samples of this selective reaction blend technology (reprocessed or not) and $PBI_{reference}$ is the property balance index obtained for the reference samples, i.e., a reference polymer composition consisting of a matrix polymer composition without the reprocessing.

$$N_{PBI} = \frac{PBI_{sample}}{PBI_{reference}} \quad (2)$$

Polymer compositions in accordance with the present disclosure may exhibit an NPBI higher than about 1.0 or higher than about one of 1.5, 2.0, 3.0, 5.0 and 10. In another embodiment, polymer compositions in accordance with the present disclosure may exhibit an $N_{PBI}$ falling within the range of 1.5 to 10 in some embodiments, and within the range of 3 to 9 in some embodiments. Polymer compositions in accordance with the present disclosure may exhibit an $N_{PBI}$ that is at least 1.5 in other embodiments. In some embodiments, the $N_{PBI}$ value is at least 1.8.

A crosslinked polymeric composition was formulated as a masterbatch (MB) composition, containing 50 wt % of polyethylene as a matrix polymer and 50 wt % of selectively crosslinked PVOH (polyvinyl alcohol) based in the masterbatch composition, which was blended with virgin high density polyethylene (HDPE) to final contents of 5 wt % of crosslinked PVOH based in the whole blend and processed in an extruder. Trials with different polyethylene (PE) resin were performed to observe the final product properties with multiple rounds of reprocessing.

The resins used in combination with the masterbatch composition (to improve the properties of the resins) include those shown in Table 1 below:

TABLE 1

| Resin | Commercial Resin (from Braskem) | Catalyst | Co-monomer* | Modality of molecular weight distribution (MWD) | Melt Index (190° C. @ 2.16 kg) | High load Melt Index (190° C. @ 21.6 kg) | Density (g/cm³) |
|---|---|---|---|---|---|---|---|
| 1 | HS5608 | Chromium | 1-hexene | Monomodal | — | 8.5 | 0.955 |
| 2 | GF4950 | Ziegler natta | 1-Butene | Bimodal | 0.36 | 28 | 0.956 |
| 3 | GF4960 | Ziegler natta | — | Bimodal | 0.34 | 28 | 0.961 |
| 4 | GF4950HS | Ziegler natta | 1-Butene | Bimodal | 0.21 | 20 | 0.951 |
| 5 | HS5502 | Chromium | 1-Hexene | Monomodal | 0.35 | 32 | 0.954 |

*The content of co-monomers is generally <1%.

The mechanical properties and yellowness index for the samples tested are shown below in Table 2.

TABLE 2

| Sample | ESCR (h) (ASTM D-1693 procedure B) | $N_{PBI}$ | Flexural Modulus (Mpa) (ASTM D-790) | IZOD impact resistance at 23° C. (J/m) (ASTM D-256) |
|---|---|---|---|---|
| Resin 2 Neat | 32 | 1 | 1150 ± 18 | 112.0 ± 3.7 |
| Resin 2 Reprocessed 1x | 37 | 1.37 | 1172 ± 20 | 130.2 ± 3.2 |
| Resin 2 Reprocessed 2x | 35 | 1.40 | 1189 ± 17 | 138.4 ± 6.5 |
| Resin 2 Reprocessed 3x | 12 | 0.45 | 1164 ± 19 | 133.1 ± 3.5 |
| Resin 2 Reprocessed 4x | 12 | 0.42 | 1167 ± 6 | 122.6 ± 2.6 |
| Resin 2 Reprocessed 5x | 11 | 0.33 | 1151 ± 17 | 108.2 ± 6.0 |
| Resin 3 Neat | 13 | 1 | 1505 ± 30 | 111.7 ± 4.3 |
| Resin 3 Reprocessed 1x | 17 | 1.76 | 1428 ± 37 | 158.7 ± 27.4 |
| Resin 3 Reprocessed 2x | 14 | 1.53 | 1497 ± 19 | 159.5 ± 18.6 |
| Resin 3 Reprocessed 3x | 12 | 1.50 | 1489 ± 37 | 183.3 ± 12.6 |
| Resin 3 Reprocessed 4x | 13 | 1.73 | 1461 ± 21 | 198.5 ± 7.1 |
| Resin 3 Reprocessed 5x | 13 | 1.58 | 1420 ± 34 | 187.5 ± 10.8 |
| Resin 1 Neat | 258 | 1 | 1196 ± 16 | 280.8 ± 14.5 |
| Resin 1 Reprocessed 1x | 160 | 0.76 | 1139 ± 22 | 362.3 ± 88.4 |
| Resin 1 Reprocessed 2x | 130 | 0.47 | 1147 ± 13 | 275.1 ± 20.3 |
| Resin 1 Reprocessed 3x | 120 | 0.53 | 1045 ± 16 | 368.2 ± 95.3 |
| Resin 2 with 5 wt % crosslinked PVOH Neat | 177 | 5.45 | 1229 ± 11 | 103.3 ± 4.0 |
| Resin 2 with 5 wt % crosslinked PVOH Reprocessed 1x | 173 | 5.48 | 1264 ± 11 | 103.2 ± 4.9 |
| Resin 2 with 5 wt % crosslinked PVOH Reprocessed 2x | 112 | 3.54 | 1269 ± 18 | 102.8 ± 3.3 |
| Resin 2 with 5 wt % crosslinked PVOH Reprocessed 3x | 155 | 5.29 | 1256 ± 22 | 112.0 ± 5.7 |
| Resin 2 with 5 wt % crosslinked PVOH Reprocessed 4x | 117 | 3.88 | 1246 ± 11 | 109.6 ± 4.7 |
| Resin 2 with 5 wt % crosslinked PVOH Reprocessed 5x | 110 | 3.88 | 1239 ± 13 | 117.4 ± 4.4 |
| Resin 3 with 5 wt % crosslinked PVOH Neat | 33 | 3.14 | 1555 ± 11 | 133.6 ± 9.4 |
| Resin 3 with 5 wt % crosslinked PVOH Reprocessed 1x | 41 | 3.49 | 1535 ± 32 | 121.2 ± 9.0 |
| Resin 3 with 5 wt % crosslinked PVOH Reprocessed 2x | 41 | 3.94 | 1464 ± 35 | 143.6 ± 20.0 |
| Resin 3 with 5 wt % crosslinked PVOH Reprocessed 3x | 39 | 4.23 | 1559 ± 37 | 151.9 ± 20.1 |

TABLE 2-continued

| Sample | ESCR (h) (ASTM D-1693 procedure B) | $N_{PBI}$ | Flexural Modulus (Mpa) (ASTM D-790) | IZOD impact resistance at 23° C. (J/m) (ASTM D-256) |
|---|---|---|---|---|
| Resin 3 with 5 wt % crosslinked PVOH Reprocessed 4x | 31 | 3.23 | 1488 ± 13 | 153.2 ± 9.5 |
| Resin 3 with 5 wt % crosslinked PVOH Reprocessed 5x | 35 | 3.82 | 1483 ± 10 | 160.9 ± 14.3 |
| Resin 1 with 5 wt % crosslinked PVOH Neat | >1000 | 4.76* | 1230 ± 28 | 272.3 ± 32.7 |
| Resin 1 with 5 wt % crosslinked PVOH Reprocessed 1x | >1000 | 4.53* | 1248 ± 31 | 314.6 ± 20.7 |
| Resin 1 with 5 wt % crosslinked PVOH Reprocessed 2x | >1000 | 5.48* | 1265 ± 29 | 375.6 ± 85.7 |
| Resin 1 with 5 wt % crosslinked PVOH Reprocessed 3x | >1000 | 4.62* | 1229 ± 24 | 325.9 ± 62.9 |
| Resin 1 with 5 wt % crosslinked PVOH Reprocessed 4x | >1000 | 3.95* | 1205 ± 9 | 283.7 ± 17.4 |
| Resin 1 with 5 wt % crosslinked PVOH Reprocessed 5x | >1000 | 4.84* | 1212 ± 16 | 345.9 ± 88.0 |

*For samples that the ESCR values were greater than 1000 h, the $N_{PBI}$ was calculated considering the value of ESCR as 1000 h.

Overall, it can be observed that Resins 1, 2 and 3 with the addition of the masterbatch presented an increase in both ESCR and $N_{PBI}$ compared to the resins without the addition of the masterbatch composition.

It can be observed from Table 2 that Resin 1 and 2 comprising the masterbatch presented a variation after reprocessing, but maintained the ESCR property more than the same resin samples without the MB for the same reprocessing conditions. Particularly for the Resin 2 with the MB, the ESCR after reprocessing 5× decreased more or less 35% when compared to the neat resin, while the Resin 2 without MB had the ESCR decreased by 70% for the same number of reprocessing steps. Samples of Resin 3 with or without masterbatch maintained the ESCR property as it was reprocessed relatively stable, but the $N_{PBI}$ value for the Resin 3 with the MB was greatly increased.

The samples produced with Resin 1 without MB showed an exponential decrease of 55% in ESCR properties. The decrease of the ESCR properties for samples of Resin 1 with MB were not able to detect as the ESCR increase was above the commonly measured with the Standard (>1000 h).

Generally, the samples with the masterbatch exhibited a decrease in ESCR while maintaining a stiffness (as measured by flexural modulus) and impact resistance level relative to the respective reference after reprocessing. Moreover, as demonstrated, the ESCR for the polymer compositions decrease with increasing steps of reprocessing, but that decrease in ESCR is more notable in reference composition (without the masterbatch).

Table 3 shows the concentration of additives in the samples before and after reprocessing.

TABLE 3

| Sample | Primary and Secondary Anti-oxidants in ppm by weight | | |
|---|---|---|---|
| | Irganox ® I-1010 | Irgafos ® I-168 Active | I-168 Degraded |
| Resin 2 Neat | 132 | 343 | 72 |
| Resin 2 Reprocessed 1x | 98 | 94 | 327 |
| Resin 2 Reprocessed 5x | 50 | <50 | 408 |
| Resin 3 Neat | 121 | 307 | 143 |
| Resin 3 Reprocessed 1x | 77 | 54 | 401 |
| Resin 3 Reprocessed 5x | <50 | <50 | 412 |
| Resin 2 with 5 wt % crosslinked PVOH Neat | 151 | 334 | 120 |
| Resin 2 with 5 wt % crosslinked PVOH Reprocessed 1 | 94 | 120 | 348 |
| Resin 2 with 5 wt % crosslinked PVOH Reprocessed 5x | 74 | <50 | 395 |
| Resin 3 with 5 wt % crosslinked PVOH Neat | 121 | 369 | 105 |
| Resin 3 with 5 wt % crosslinked PVOH Reprocessed 1x | 102 | 299 | 98 |
| Resin 3 with 5 wt % crosslinked PVOH Reprocessed 5x | 61 | <50 | 352 |

Table 3 demonstrates the concentration of additives in the samples with and without masterbatch after processing. It can be noted that additives used for the processing stabilization of polymers reacted with the products formed by degradation of polymers in the process thereby decreasing the amount of antioxidant presents in the polymer. That behavior was similar in neat HDPE and polymers produced with crosslinked polymer technology. The process degradation can decrease the performance of polymers, explaining the changes in neat polymer ESCR property. Although samples incorporating the crosslinked polymer masterbatch also showed a decrease in concentration of additives after reprocessing, they did not have drastic changes in ESCR property.

The masterbatch produced above were also blended with the polyethylene (HDPE) of Table 1 to final contents of 3 wt % of crosslinked PVOH based in the whole blend and processed in an extruder. Trials with different polyethylene (PE) resin were performed to observe the final product properties with multiple rounds of reprocessing, as presented in Table 4.

TABLE 4

| SAMPLE | ESCR (h) (ASTM D-1693 procedure B) | Flexural Modulus (Mpa) (ASTM D-790) |
|---|---|---|
| Resin 1 Neat | 180 | 1227 |
| Resin 1 Reprocessed 1x | 162 | 1337 |
| Resin 1 Reprocessed 3x | 91 | 1270 |
| Resin 1 Reprocessed 5x | 60 | 1358 |
| Resin 1 with 3 wt % crosslinked PVOH Neat | 700 | 1247 |
| Resin 1 with 3 wt % crosslinked PVOH Reprocessed 1x | 510 | 1355 |
| Resin 1 with 3 wt % crosslinked PVOH Reprocessed 3x | 480 | 1285 |
| Resin 1 with 3 wt % crosslinked PVOH Reprocessed 5x | 400 | 1359 |
| Resin 2 Neat | 29 | 1295 |
| Resin 2 Reprocessed 1x | 40 | 1342 |
| Resin 2 Reprocessed 3x | 24 | 1185 |
| Resin 2 Reprocessed 5x | 9.1 | 1386 |
| Resin 2 with 3 wt % crosslinked PVOH Neat | 90 | 1363 |
| Resin 2 with 3 wt % crosslinked PVOH Reprocessed 1x | 51 | 1408 |
| Resin 2 with 3 wt % crosslinked PVOH Reprocessed 3x | 30 | 1501 |
| Resin 2 with 3 wt % crosslinked PVOH Reprocessed 5x | 23 | 1398 |
| Resin 4 Neat | 107 | 1062 |
| Resin 4 Reprocessed 1x | 75 | 1076 |
| Resin 4 Reprocessed 3x | 21 | 1369 |
| Resin 4 Reprocessed 5x | 37 | 1115 |
| Resin 4 with 3 wt % crosslinked PVOH Neat | 450 | 1088 |
| Resin 4 with 3 wt % crosslinked PVOH Reprocessed 1x | 275 | 1163 |
| Resin 4 with 3 wt % crosslinked PVOH Reprocessed 3x | 270 | 1143 |
| Resin 4 with 3 wt % crosslinked PVOH Reprocessed 5x | 260 | 1196 |
| Resin 5 Neat | 9.2 | 1264 |
| Resin 5 Reprocessed 1x | 6.2 | 1431 |
| Resin 5 Reprocessed 3x | 5.5 | 1483 |
| Resin 5 Reprocessed 5x | 2.8 | 1475 |
| Resin 5 with 3 wt % crosslinked PVOH Neat | 25 | 1388 |
| Resin 5 with 3 wt % crosslinked PVOH Reprocessed 1x | 11 | 1445 |
| Resin 5 with 3 wt % crosslinked PVOH Reprocessed 3x | 9.3 | 1550 |
| Resin 5 with 3 wt % crosslinked PVOH Reprocessed 5x | 8.3 | 1495 |

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:
1. A method, comprising:
   reprocessing a polymer composition comprising a crosslinked polymeric composition, wherein the crosslinked polymeric composition comprises a matrix polymer having a polar polymer internal phase that is selectively crosslinked with a crosslinking agent;
   wherein the reprocessed polymer composition retains an environmental stress cracking resistance within 60% of the value for the initial polymer composition when measured according to ASTM D-1693 procedure B; and
   wherein the reprocessed polymer composition presents a Normalized Property Balance Index ($N_{PBI}$) greater than about 1.0, wherein the $N_{PBI}$ is calculated according to the formula:

$$N_{PBI} = \frac{PBI_{sample}}{PBI_{reference}},$$

where $PBI_{Sample}$ is the property balance index for a sample of the polymer composition, and $PBI_{Reference}$ is the property balance index of a reference polymer composition consisting of a matrix polymer composition without the reprocessing; and wherein PBI is calculated according to the formula:

$$PBI = \frac{FM \times IR \times ESCR}{10^7},$$

where FM is the flexural modulus of the sample as determined by secant modulus of elasticity at 1% deformation according to ASTM D-790 in MPa, IR is the IZOD impact resistance according to ASTM D-256 in Jim, and ESCR is the environmental stress cracking resistance according to ASTM D1693 procedure B in hours.

2. The method of claim 1, wherein reprocessing comprises regrinding the crosslinked polymeric composition.

3. The method of claim 1, further comprising combining the reprocessed crosslinked polymeric composition with a secondary polymer composition.

4. The method of claim 3, wherein combining the crosslinked polymeric composition with a secondary polymer composition comprises a melt blend process.

5. The method of claim 3, wherein combining the crosslinked polymeric composition with a secondary polymer composition comprises a dry blend process.

6. The method of claim 3, wherein the secondary polymer composition comprises a virgin resin.

7. The method of claim 3, wherein the secondary polymer composition comprises a post-industrial polymer resin, a post-consumer polymer resin, a regrind polymer resin and combinations thereof.

8. The method of claim 1, wherein the polymer composition further comprises a secondary polymer composition that is reprocessed with the crosslinked polymeric composition.

9. A polymer composition, comprising:
a reprocessed crosslinked polymeric composition comprising:
a matrix polymer comprising a polyolefin, and
one or more polymer particles dispersed in the polymer matrix, wherein the one or more polymer particles comprise a polar polymer selectively crosslinked with a crosslinking agent,
wherein the reprocessed crosslinked polymer composition retains an environmental stress cracking resistance after reprocessing that is within 60% of the value for the initial crosslinked polymeric composition when measured according to ASTM D-1693 procedure B.

10. The polymer composition of claim 9, wherein the matrix polymer is present in a range of 30 wt % to 99.9 wt % of the crosslinked polymeric composition.

11. The polymer composition of claim 9, wherein the one or more polymer particles is present in a range of 0.1 wt % to 70 wt % of the crosslinked polymeric composition.

12. The polymer composition of claim 9, wherein the polar polymer comprises at least one functional group selected from the group consisting of hydroxyl, carboxylic acid, carboxylate, ester, ether, acetate, amide, amine, epoxy, imide, imine, sulfone, phosphone and their derivatives.

13. The polymer composition of claim 9, wherein the polar polymer is selected from the group consisting of polyvinyl alcohol, ethylene vinyl alcohol copolymer, ethylene vinyl acetate copolymer and mixtures thereof.

14. The polymer composition of claim 9, wherein the crosslinking agent is selected from the group consisting of maleic anhydride, maleic acid, itaconic acid, itaconic anhydride, succinic acid, succinic anhydride, succinic aldehyde, adipic acid, adipic anhydride, phthalic anhydride, pthalic acid, glutaconic acid, glutaconic anhydride, citric acid, glutaraldehyde, sodium tetraborate, organic titanates such as tetrabutyl titanate, organic zirconates such as zirconium(IV) bis(diethyl citrato)dipropoxide, methoxy polyethylene glycol acrylates, ethoxy polyethylene glycol acrylates, ethylene glycol diacrylate, ethylene glycol dimethacrylate, polypropylene glycol diacrylate, polypropylene glycol dimethacrylate, 1,3-butylene glycol diacrylate, 1,3-butylene glycol dimethacrylate, neopentyl glycol diacrylate, neopentyl glycol dimethacrylate, trimethylol ethane triacrylate, trimethylol ethane trimethacrylate, trimethylol propane triacrylate, trimethylol propane trimethacrylate, and tetramethylol methane tetracrylate, their derivatives and mixtures thereof.

15. The polymer composition of claim 9, wherein the polymer composition comprises one or more biobased polymers.

16. The polymer composition of claim 9, wherein the crosslinked polymeric composition retains an environmental stress cracking resistance after reprocessing at least 3 times that is within 60% of the value for the initial crosslinked polymeric composition when measured according to ASTM D1693 procedure B.

17. The polymer composition of claim 9, wherein the polymer composition presents a Normalized Property Balance Index ($N_{PBI}$) greater than about 1.0, wherein the $N_{PBI}$ is calculated according to the formula:

$$N_{PBI} = \frac{PBI_{sample}}{PBI_{reference}},$$

where $PBI_{Sample}$ is the property balance index for a sample of the polymer composition, and $PBI_{Reference}$ is the property balance index of a reference polymer composition consisting of a matrix polymer composition without the reprocessing; and wherein PBI is calculated according to the formula:

$$PBI = \frac{FM \times IR \times ESCR}{10^7},$$

where FM is the flexural modulus given by the secant modulus at 1% of deformation measured according to ASTM D-790 in MPa, "IR" is the IZOD impact resistance at 23° C. measured according to ASTM D-256 in Jim, and "ESCR" is the environmental stress cracking resistance measured according to ASTM D-1693 procedure B in hours (h).

18. The polymer composition of claim 9, wherein the polymer composition further comprises a secondary polymer composition.

19. The polymer composition of claim 18, wherein the secondary polymer composition comprises a post-industrial polymer resin, a post-consumer polymer resin, a regrind polymer resin and combinations thereof.

20. The polymer composition of claim 18, wherein the second polymer composition is a virgin polymer.

21. A manufactured article comprising the polymer composition of claim 9.

22. The manufactured article of claim 21, wherein the article is an injection molded article, a thermoformed article, a film, a foam, a blow molded article, a 3D printed article, a compression molded article, a coextruded article, a laminated article, an injection blow molded article, a rotomolded article, an extruded article, or a pultruded article.

23. The manufactured article of claim 22, wherein the article is a monolayer article.

24. The manufactured article of claim 22, wherein the article is a multilayer article and at least one of the layers comprises the polymer composition.

25. A method, comprising:
reprocessing a polymer composition comprising a masterbatch composition and a secondary polymer composition, wherein the masterbatch composition comprises a matrix polymer having a polar polymer internal phase that is selectively crosslinked with a crosslinking agent;

wherein the reprocessed polymer composition retains an environmental stress cracking resistance within 60% of the value for the initial polymer composition when measured according to ASTM D-1693 procedure B; and wherein the reprocessed polymer composition presents a Normalized Property Balance Index ($N_{PBI}$) greater than about 1.0, wherein the $N_{PBI}$ is calculated according to the formula:

$$N_{PBI} = \frac{PBI_{sample}}{PBI_{reference}},$$

where $PBI_{Sample}$ is the property balance index for a sample of the polymer composition, and $PBI_{Reference}$ is the property balance index of a reference polymer composition consisting of a matrix polymer composition without the reprocessing; and wherein PBI is calculated according to the formula:

$$PBI = \frac{FM \times IR \times ESCR}{10^7},$$

where FM is the flexural modulus of the sample as determined by secant modulus of elasticity at 1% deformation according to ASTM D-790 in MPa, IR is the IZOD impact resistance according to ASTM D-256 in J/m, and ESCR is the environmental stress cracking resistance according to ASTM D1693 procedure B in hours.

26. A polymer composition comprising:
a masterbatch of a reprocessed polymer composition comprising a matrix polymer having a polar polymer internal phase that is selectively crosslinked with a crosslinking agent;
wherein the masterbatch of the reprocessed polymer composition retains an environmental stress cracking resistance within 60% of the value for the initial polymer composition when measured according to ASTM D-1693 procedure B; and
wherein the reprocessed polymer composition presents a Normalized Property Balance Index ($N_{PBI}$) greater than about 1.0, wherein the $N_{PBI}$ is calculated according to the formula:

$$N_{PBI} = \frac{PBI_{sample}}{PBI_{reference}},$$

where $PBI_{Sampie}$ is the property balance index for a sample of the reprocessed polymer composition, and $PBI_{Reference}$ is the property balance index of a reference polymer composition consisting of a matrix polymer composition without the reprocessing; and wherein PBI is calculated according to the formula:

$$PBI = \frac{FM \times IR \times ESCR}{10^7},$$

where FM is the flexural modulus of the sample as determined by secant modulus of elasticity at 1% deformation according to ASTM D-790 in MPa, IR is the IZOD impact resistance according to ASTM D-256 in J/m, and ESCR is the environmental stress cracking resistance according to ASTM D1693 procedure B in hours; and
a secondary polymer composition.

* * * * *